United States Patent [19]

Butler, Jr.

[11] 4,068,638
[45] Jan. 17, 1978

[54] FUEL VAPORIZING METHOD AND APPARATUS

[76] Inventor: Farrell G. Butler, Jr., P.O. Box 763, Pearland, Tex. 77581

[21] Appl. No.: 596,309

[22] Filed: July 16, 1975

[51] Int. Cl.² .......................................... F02M 31/00
[52] U.S. Cl. ......................... 123/122 AA; 123/122 R; 123/141; 261/144; 261/145; 48/180 R
[58] Field of Search ................ 123/122 AA, 122 AB, 123/122 R, 141, 124 R, 124 A; 261/145, 144; 48/180 R

[56] References Cited

U.S. PATENT DOCUMENTS

| 1,256,976 | 2/1918 | Brock | 123/124 |
|---|---|---|---|
| 3,042,016 | 7/1962 | Christian | 123/122 AA |
| 3,053,242 | 9/1962 | Arpaia | 123/122 AA |
| 3,918,423 | 11/1975 | Amor | 123/141 |

FOREIGN PATENT DOCUMENTS

| 594,334 | 3/1934 | Germany | 123/141 |
|---|---|---|---|
| 490,236 | 2/1954 | Italy | 48/180 R |

Primary Examiner—Ronald H. Lazarus
Attorney, Agent, or Firm—Bard, Springs, Jackson & Groves

[57] ABSTRACT

Methods and apparatus are provided for increasing the vaporized proportion of a stream of volatile liquid fuel supply to an internal combustion engine. The non-volatilized portions of the fuel discharged from the carburetor are traveled over a plurality of flow surfaces, such as the surfaces of a layer of metal balls and the like, whereby the fuel mixture will not only be more evenly distributed, but whereby the liquid portion therein will also convert to a vapor before entering the intake manifold of the engine. In addition, a coil of tubing is also preferably provided with one end arranged to receive fresh air heated by the exhaust manifold of the engine, and with the other end downwardly directed from the layer of balls to the intake manifold, whereby the hot air will not only heat and further enhance vaporization of any remaining fuel liquids, but will also create a downdraft further redistributing the fuel vapor being supplied to the engine.

5 Claims, 4 Drawing Figures

U.S. Patent   Jan. 17, 1978   4,068,638
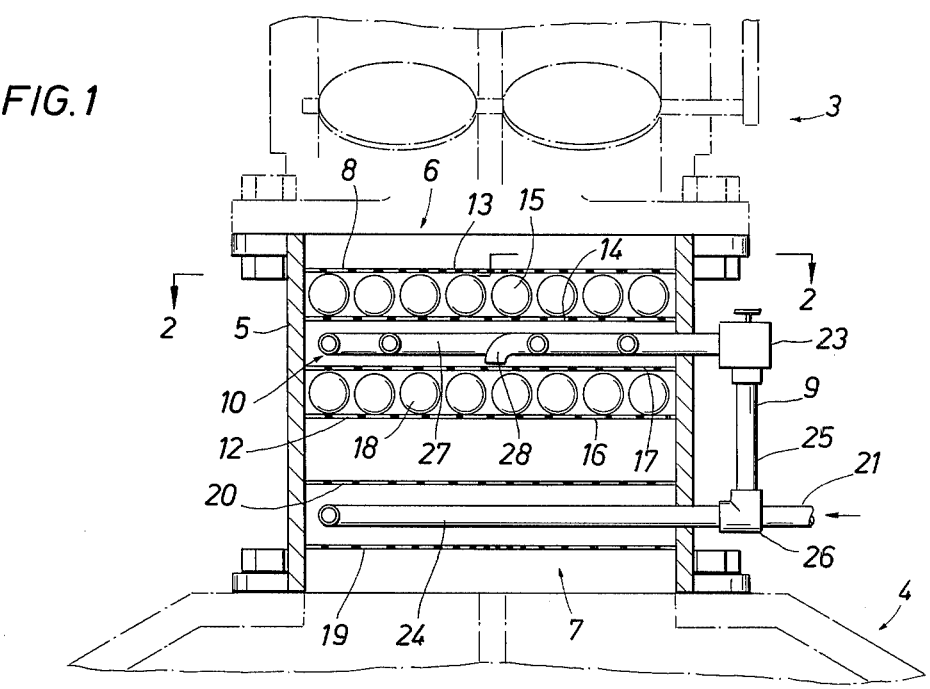
FIG.1
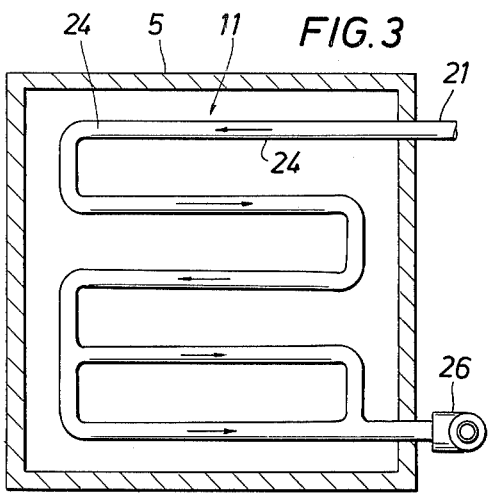
FIG.3
FIG.2
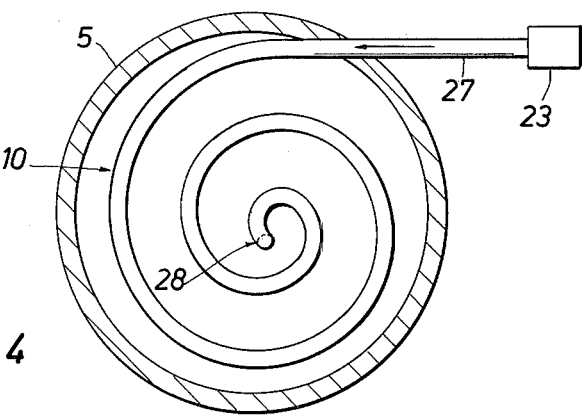
FIG.4

FUEL VAPORIZING METHOD AND APPARATUS

BACKGROUND OF THE INVENTION

This invention relates to means and methods of providing a volatile liquid fuel to an internal combustion engine and the like, and more particularly relates to improved methods and apparatus for enhancing the volatilization of such fuel.

It is well known that an internal combustion engine operates by the combustion of gasoline and other such volatile liquids, and it is further well known that the liquid must be converted to a vapor in order for it to be burned to operate the engine. Accordingly, it is well known to employ a conventional carburetor which not only functions to vaporize a stream of gasoline leading to the engine, but which regulates the quality of the fuel vapor by combining it with appropriate amounts of air.

As hereinbefore stated, the fuel, whether combined with air or used in an undiluted ratio, must be vaporized before it can be effectively used in the engine. Accordingly, if such vaporization is less than complete, the non-vaporized liquid will not be employed and thus will be wasted. Although many improvements have been made to conventional carburetors and the like, and also many auxiliary devices such as heaters and so forth have been employed, it is nevertheless a fact that the vaporization rate for fuel used in the conventional internal combustion engine is substantially less than that which is desired, and that, accordingly, substantial amounts of gasoline and other like fuels are continually wasted for this reason.

These disadvantages of the prior art are overcome with the present invention, and improved methods and apparatus are herewith provided for substantially enhancing the vaporization rate of fuel utilized in an internal combustion engine and the like.

SUMMARY OF INVENTION

In an ideal embodiment of this invention, auxiliary apparatus is interconnected between the carburetors and the intake manifold portion of an internal combustion engine, such auxiliary apparatus preferably being comprised of a housing, a diffusion means preferably composed of a layer of closely associated metal balls and the like, and a heating means composed of a coil having one end connected to receive an input of fresh air heated by the manifold of the engine and having its other end located in the housing and downwardly directed from the metal balls toward the outlet end of the housing.

In this arrangement, the combination of liquid and gaseous fuel will enter the upper end of the housing from the carburetor by gravity flow and will then pass through the spaces between the metal balls in traveling to the combustion cylinders. The vapor will pass between the metal balls without obstruction, but the liquid will tend to flow over the surfaces of the metal balls, thereby thinning such flow and thereby further enhancing vaporization of this nonvaporized liquid before it leaves the metal balls to continue travel to the combustion cylinders. The heater is preferably a coil of tubing for receiving a supply of heated fresh air. Accordingly, one open end of the tubing is preferably located at the manifold whereby air entering this end will be suitably heated. The other end of the coil of tubing is preferably disposed at the enter of the flow path through the housing and is directed downward toward the combustion cylinders. Thus, the downward flow of fuel to the intake manifold will create a vacuum at this second open end and this, in turn, will draw the heated air through this coil of tubing to not only heat, heated air and therefore enhance, the volatilization of any non-volatilized liquids discharging from the metal balls, but it will also combine with and restore the proper air/fuel ration previously established by the carburetor and upset by the addition of the fuel vapors from the liquids which the carburetor failed to vaporize as hereinbefore stated.

It will be apparent that the essential object is to spread the non-volatilized fuel over as much of the surface as provided by the metal balls as is possible. Accordingly, means such as a perforated plate is preferably disposed across the intake end of the housing, such plate having relatively small holes in the center portion of its center portion, and having holes of increasing diameter extending toward the outer edge of the plate, whereby the fuel coming from the carburetor will tend to be more equally distributed across the cross-section of the flow path leading downward through the housing and over the metal balls.

It is a feature of the present invention to provide means for diverting and diffusing the nonvolatilized portions of a liquid fuel traveling to the combustion cylinders of an internal combustion engine.

Accordingly, these and other features and advantages of the present invention will be more apparent from the following detailed description, where reference is made to the figures in the accompanying drawing.

IN THE DRAWINGS

FIG. 1 is a simplified pictorial representation, partly in cross-section, of one embodiment of the invention.

FIG. 2 is a simplified pictorial representation of a portion of the apparatus depicted in FIG. 1, and more particularly depicting means for equalizing the fuel flow across the cross-section of the path leading through the apparatus of FIG. 1.

FIG. 3 is a simplified pictorial representation of another portion of the apparatus depicted in FIG. 1, and is more particularly directed to apparatus for heating and conducting the fuel through the apparatus of FIG. 1.

FIG. 4 is a simplified pictorial representation of an alternative embodiment of the apparatus depicted in FIG. 3.

DETAILED DESCRIPTION

Referring now to FIG. 1, there may be seen a simplified pictorial representation of one form of vaporizing apparatus 2 interconnected between the carburetor 3 and the intake manifold 4 of a conventional internal combustion engine, and comprising a housing 5 having an upper intake port 6 connected with the lower end of the carburetor 3 and a lower outlet port 7 interconnected with the upper end of the combustion chamber 4. More particularly, the vaporizing apparatus 2 may be seen to include a first diffusion assembly 8 interposed across the flow path extending between the intake and outlet ports 6–7, a heater assembly 9 having a first or upper heating element 10 interposed immediately downstream of the first diffusion assembly 8 and a second heating element 11 disposed adjacent the outlet port 7 of the housing, and preferably a second diffusion assembly 12 interposed between the first and second heating elements 10–11.

Referring more particularly to the apparatus depicted in FIG. 1, the first diffusion assembly may be seen to be composed of a spreading grid 13 interposed across the flow path leading through the housing 5 from the carburetor 3 to the intake manifold 4 and immediately adjacent the intake port 6 of the housing 5. In addition, there may be seen a supporting grid 14 spaced immediately below the spreading grid 13 for supporting a layer of closely spaced matal balls 15 and the like. Accordingly, the fuel mixture of volatilized and non-volatilized liquids departing the carburetors 3 may be seen to travel through the spreading and supporting grids 13-14 and through the spaces through the metal balls 15 before reaching and traversing the first heating element 10 of the heater assembly 9. After traversing the first heating element 10, the fuel vapor, together with any yet unvolatilized liquids, will then traverse the second diffusion assembly 12 in the same manner as the first diffusion assembly 8 before reaching and traversing the second heating element 11 disposed across the flow path and between the two spreading grids 19-20 at the outlet port 7 of the housing 5.

The supporting grids 14, 16-17 may conveniently be perforated metal plates or screens having apertures of circular or other suitable configuration, whereby the vapor and liquid in the fuel mixture may be admitted to the combustion chamber 4 without significant obstruction, inasmuch as the function of the supporting grids 14, 16-17 is merely to support the two layers of metal balls 15, 18. However, the function of the spreading grids 13, 19-20 is different, in that it is to more equally distribute the non-volatilized liquid fuel across the cross-section of the flow path extending from the intake port 6 to the outlet port 7 of the housing 5. As hereinbefore explained, the function of the metal balls 15, 18 is to provide a plurality of extended diffusion surfaces whereby non-volatilized liquid spreading over such surfaces will be more readily vaporized before reaching the intake manifold 4. Accordingly, if the flow is concentrated in a narrow stream along the flow path, it will apparently flow only over a relatively few of the depicted metal balls 15, 18, thereby tending to limit the effectiveness of the subject invention. This disadvantage is minimized or eliminated by the varying sizes of the apertures in the spreading grids 13, 19-20, since the apertures in the center of these grids will be small with respect to the apertures in the portions of the grid extending from their centers to their outer perimeters.

Referring now to FIG. 2, there may be seen a simplified pictorial and partially cut-away representation of the first diffusion assembly 8 depicted more generally in FIG. 1. More specifically, there may be seen an arrangement including the housing 5 and the layer of metal balls extending therein across the flow path leading from the carburetor 3 to the intake manifold 4. Also shown is the spreading grid 13 with its apertures of relatively small size adjacent its center portion, and with its apertures increasing in size as they extend to the outer perimeter of the spreading grid 13 as hereinbefore explained.

It will be noted that the housing 5, and therefore the spreading grid 13, is shown in FIG. 2 with a square or rectangular configuration. However, it should also be noted that the shape or configuration of the housing 5 and spreading grid 13, except for the size and arrangement of the apertures in such spreading grid 13, is not a material feature of the operation of the apparatus depicted in FIG. 1, and therefore such housing 5 may be any suitable configuration such as round, oval, or other shape. Also, the apertures in the spreading grids 13, 19-20 may be of any suitable shape and configuration.

Referring now to FIG. 3, there may be seen a simplified pictorial representation, partly in cross-section, of the lower heating element 10 of the heater assembly 9 depicted in FIG. 1. More particularly, the lower heating element 10 may be seen in FIG. 3 to be composed of a length of metal tubing or coil 24 criss-crossing the flow path in the housing 5 and having an intake portion tube 21 which may conveniently extend to and connect with the exhaust manifold (not depicted) of the engine, but which has its end open to receive fresh ambient air from the atmosphere. The other end of the lower coil 24 is connected to a conventional ell fitting 26 which, as indicated in FIG. 1, is connected to a nipple 9 vertically rising to the adjustment valve 23.

As hereinbefore stated, the configuration of the housing 5 is not a function of the apparatus depicted and described herein, and thus the housing may be round as depicted in FIG. 4, or square or rectangular as depicted in FIG. 3, or have any other suitable configuration as may be preferable and consistent with the operation of the engine. Similarly, the lower coil 24 may be in conventional coiled configuration as illustrated in FIG. 4, or it may be arranged in criss-cross fashion as suggested by the configuration of the upper coil 24 specifically depicted in FIG. 3. More particularly, the configuration of the upper coil 24 will be preferably that which provides heating for the fuel passing through the housing 5, and therefore will primarily be dependent upon the configuration of the housing 5 itself.

Referring now to FIG. 4, there may be seen a simplified pictorial representation of the upper heating element 11 previously described with respect to FIG. 1. More particularly, the upper heating element 11 may be seen to include a tubing coil 27 arranged in spiral form across the flow path through the housing 5 with one end connected to receive heated air from the valve 23, and with its other end 28 arranged at the center of the flow path and opening downward toward the second diffusion assembly 12 as depicted in FIG. 1.

As previously explained, it is a function of both the upper and lower coils 24, 27 to heat the fuel mixture and in this way to assist in enhancing vaporization of the liquids entering from the carburetor 3. In addition, however, the fuel flow through the housing 5 will create a pressure drop at the end 28 of the coil 27, and this in turn will draw air from the coil 27 to combine with the vaporized fuel in the housing 5 as hereinbefore explained. This not only provides a leaner fuel mixture, but it further aids redistribution of the mixture of vapor and liquid passing to second or lower diffusion assembly 12.

As previously stated, the configuration of the housing 5 is not a function of the operation of the apparatus depicted herein, and thus the housing 5 will be noted as having been depicted in circular configuration in FIG. 4. Similarly, if the housing 5 in FIG. 4 has been provided with a square or rectangular configuration, as in FIGS. 2 and 3, the lower coil 27 may also be provided with a criss-cross configuration, as in the case of FIG. 3.

In addition to the features hereinbefore discussed, the present invention has other features and advantages not previously mentioned. In this regard, it is well known that the shutters in a conventional carburetor of the type suggested in FIG. 1 will inherently tend to deflect fuel flow into the rear portion of the intake manifold, and that this tends to feed the fuel mixture into the rear cylinders of the engine at the expense of the forward cylinders therein. The spreading grids 13, 19–20 provided in the present invention will, therefore, further improve the operation of the engine by redistributing and equalizing this fuel flow into the intake manifold 4, whereby the forward cylinders will receive a more equitable input of fuel.

It will be apparent from the foregoing that many other modifications and variations may be made in the form of the structures depicted herein. Accordingly, it should be clearly understood that the forms and details of the structures and techniques described herein and depicted in the accompanying drawing are intended as illustrations only, and are not intended as limitations on the scope of the subject invention.

What is claimed is:

1. In an engine or the like employing a volatile liquid fuel and having carburetor means and internal combustion cylinder means, the improvement in combustion therewith comprising housing means interconnected therewith and having an intake port for receiving fuel from the carburetor means and an outlet port for defining a flow path from the carburetor means to the combustion cylinder means, a plate member positioned in said housing adjacent said intake port and laterally disposed across said flow path and having a plurality of apertures therein of a size increasing as a function of their relative lateral displacement from the axial center of said flow path, support means spaced apart from said plate member and disposed laterally across said flow path in said housing, a plurality of spherical members disposed in close proximity between said support means and said plate member, tubular means having a first end connected to a source of heated air and extended along a circuitous path in close proximity to said said support means for supplying heat to said spherical members and having a second end disposed along the axial center of said flow path for discharging said heated air along said flow path toward said outlet port, and adjustment means interposed in said tubular means for regulating said heat supplied to said spherical members.

2. The improvement described in claim 1, further including second support means disposed laterally across said flow path in said housing between said tubular means and said outlet port and adjacent said tubular means, third support means disposed laterally across said flow path in said housing between said second support means and said outlet port and spaced apart from said second support means, and a second plurality of spherical members disposed in close proximity between said second and third support means.

3. The improvement described in claim 1, further including a second plate member positioned in said housing adjacent said outlet port and laterally disposed across said flow path and having a plurality of apertures therein of a size increasing as a function of their relative lateral displacement from the axial center of said flow path.

4. The improvement described in claim 3, wherein said tubular means comprises first and second interconnected coil sections, said first end connecting said second coil section to a source of heated air and said second end disposed along said axial center of said flow path for discharging said heated air from said first coil section along said flow path with said first coil section disposed in said housing between said first and second plurality of spherical members and said second coil section disposed in said housing between said second plurality of spherical members and said second plate member.

5. The improvement described in claim 4, wherein said adjustment means is a manually-operable valve interposed in said tubular means between said first and second coil sections.

* * * * *